Figure 1:
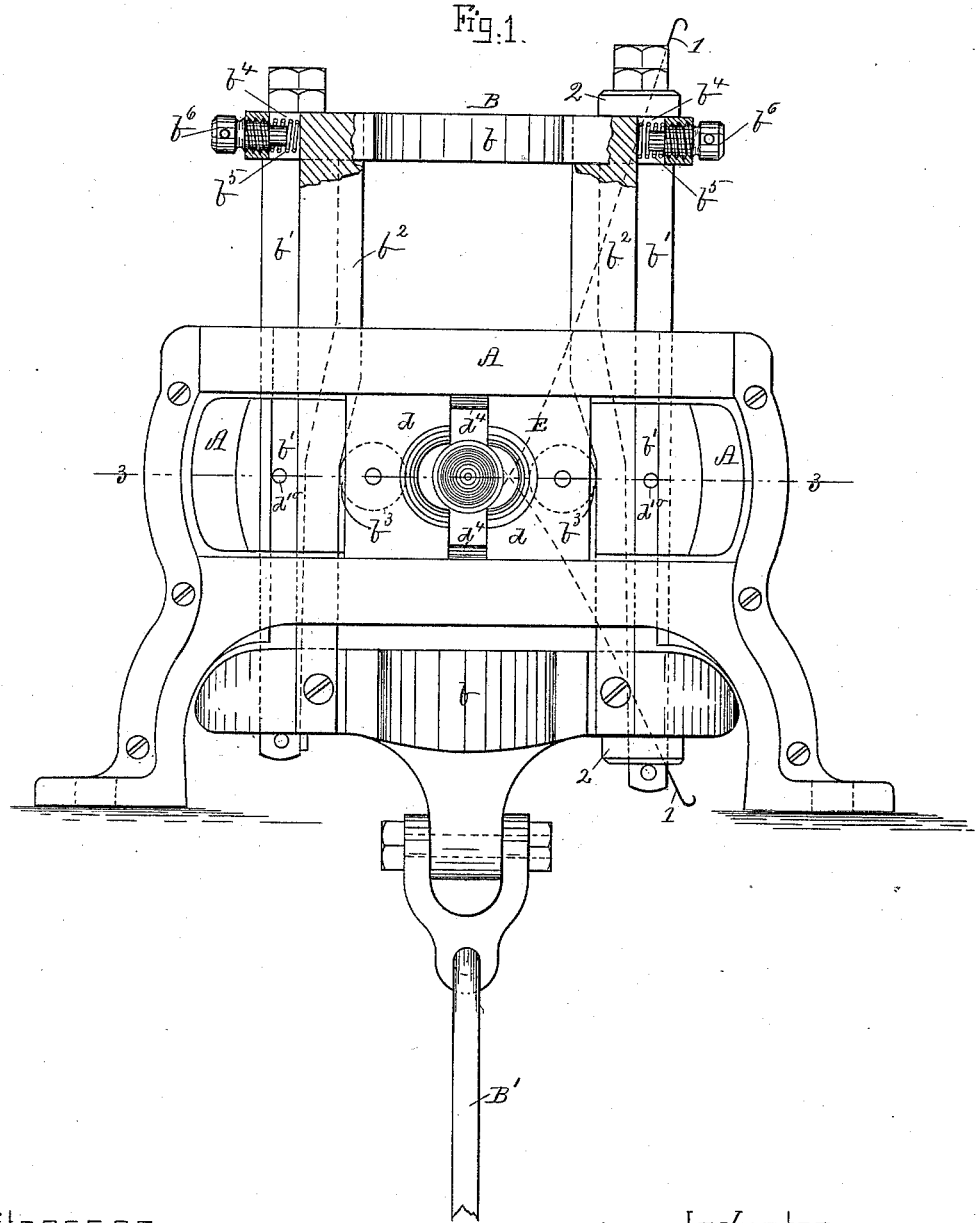

(No Model.)

G. A. FULLERTON.
BOTTLE MAKING MACHINE.

No. 426,497.  Patented Apr. 29, 1890.

Witnesses.

Inventor.
George A. Fullerton,
by his attorneys (No Model.)  7 Sheets—Sheet 2.
G. A. FULLERTON.
BOTTLE MAKING MACHINE.
No. 426,497. Patented Apr. 29, 1890.
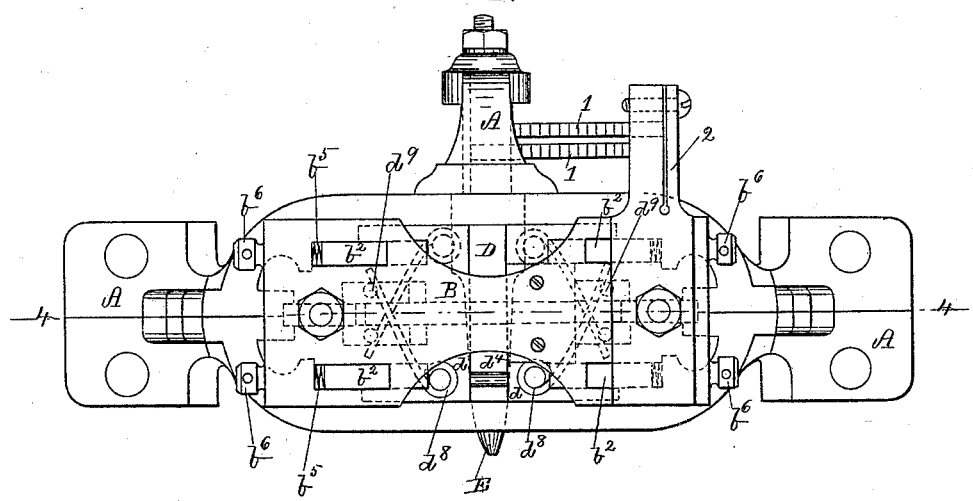

(No Model.)  7 Sheets—Sheet 3.
G. A. FULLERTON.
BOTTLE MAKING MACHINE.
No. 426,497. Patented Apr. 29, 1890.
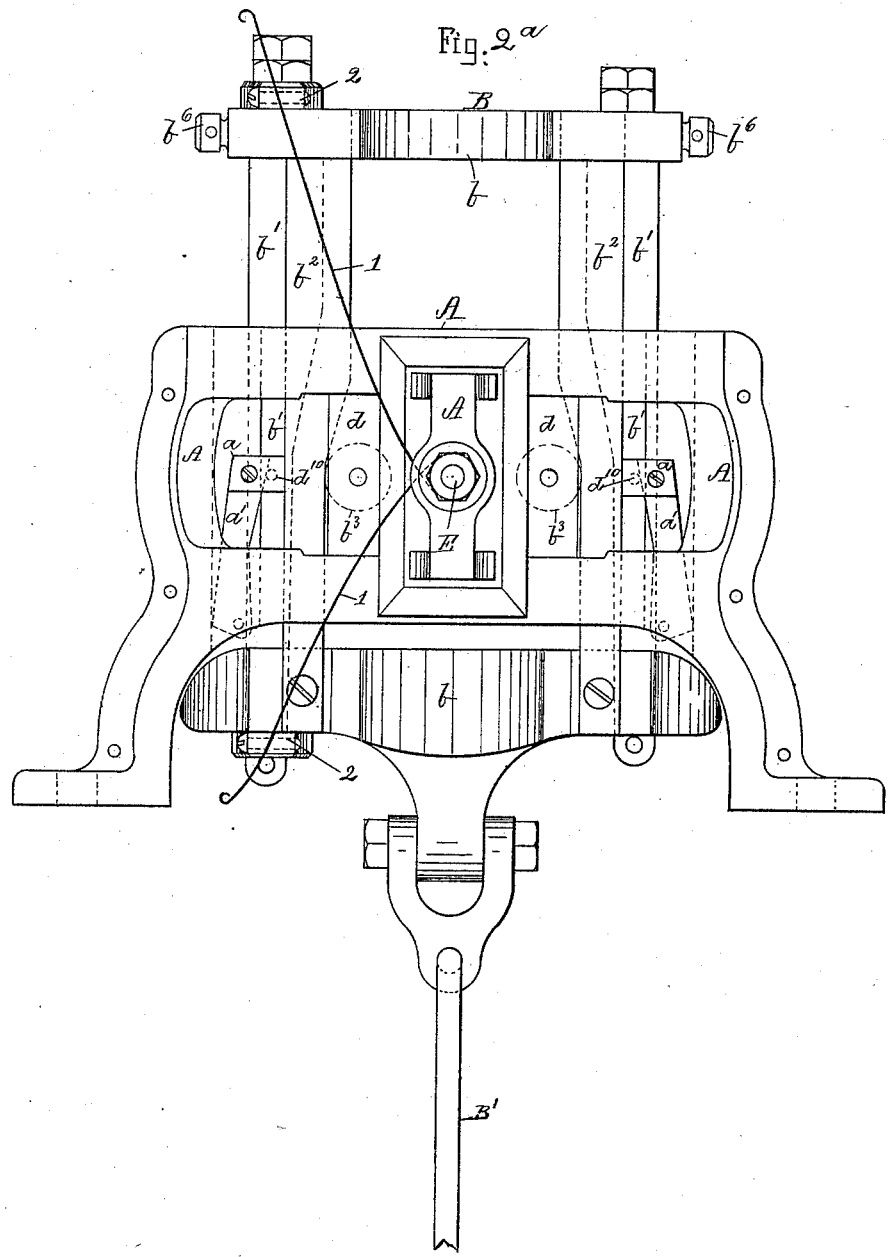
Witnesses.
Inventor
George A. Fullerton,
by his attorneys, (No Model.) 7 Sheets—Sheet 4.
G. A. FULLERTON.
BOTTLE MAKING MACHINE.
No. 426,497. Patented Apr. 29, 1890.
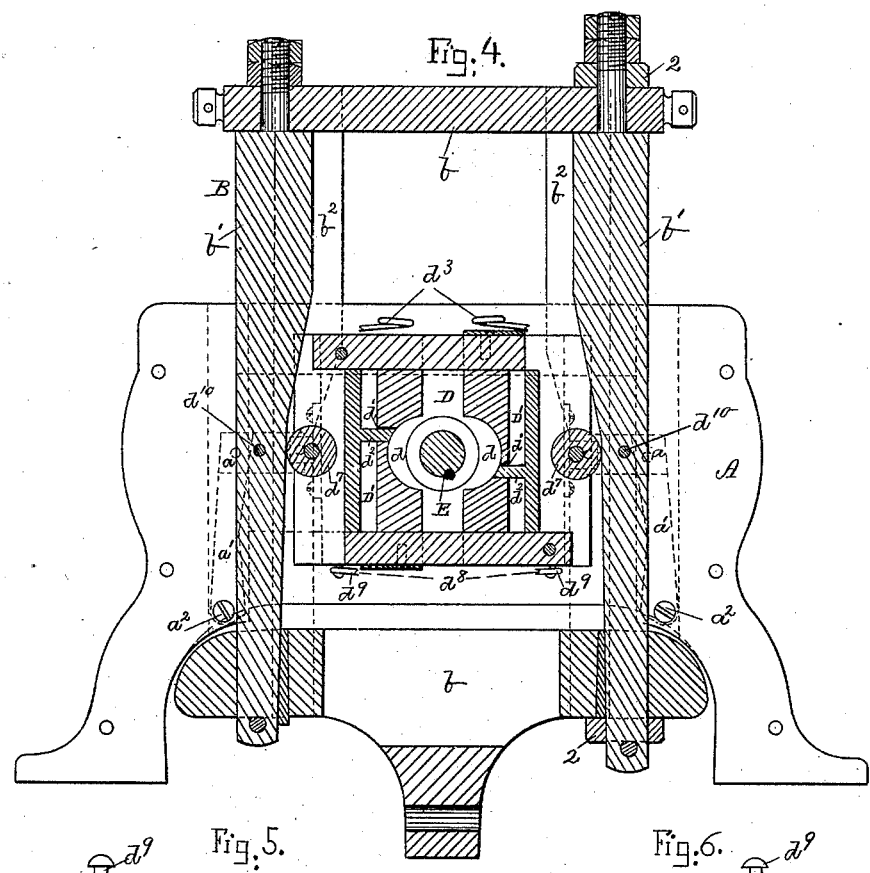
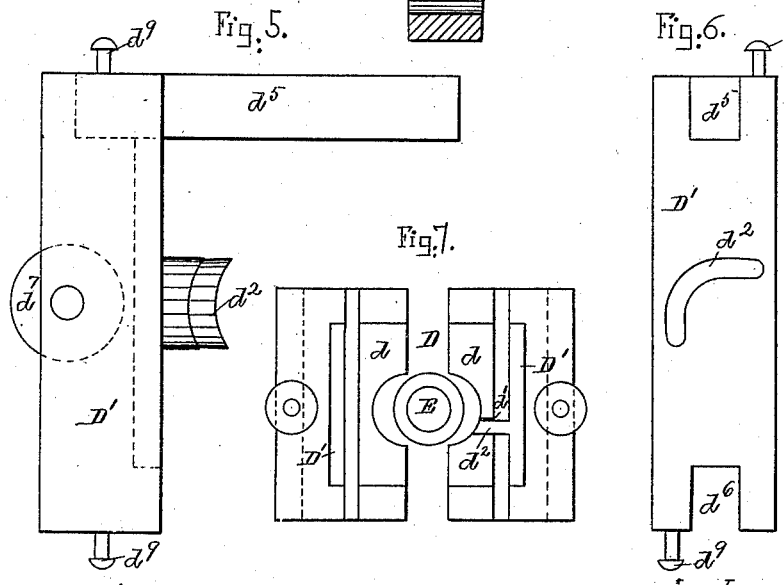
Witnesses.
Lauritz W. Miller
John R. Snow.
Inventor.
George A. Fullerton
by his attorneys,
Magrader & Beach (No Model.) 7 Sheets—Sheet 5.
G. A. FULLERTON.
BOTTLE MAKING MACHINE.
No. 426,497. Patented Apr. 29, 1890.
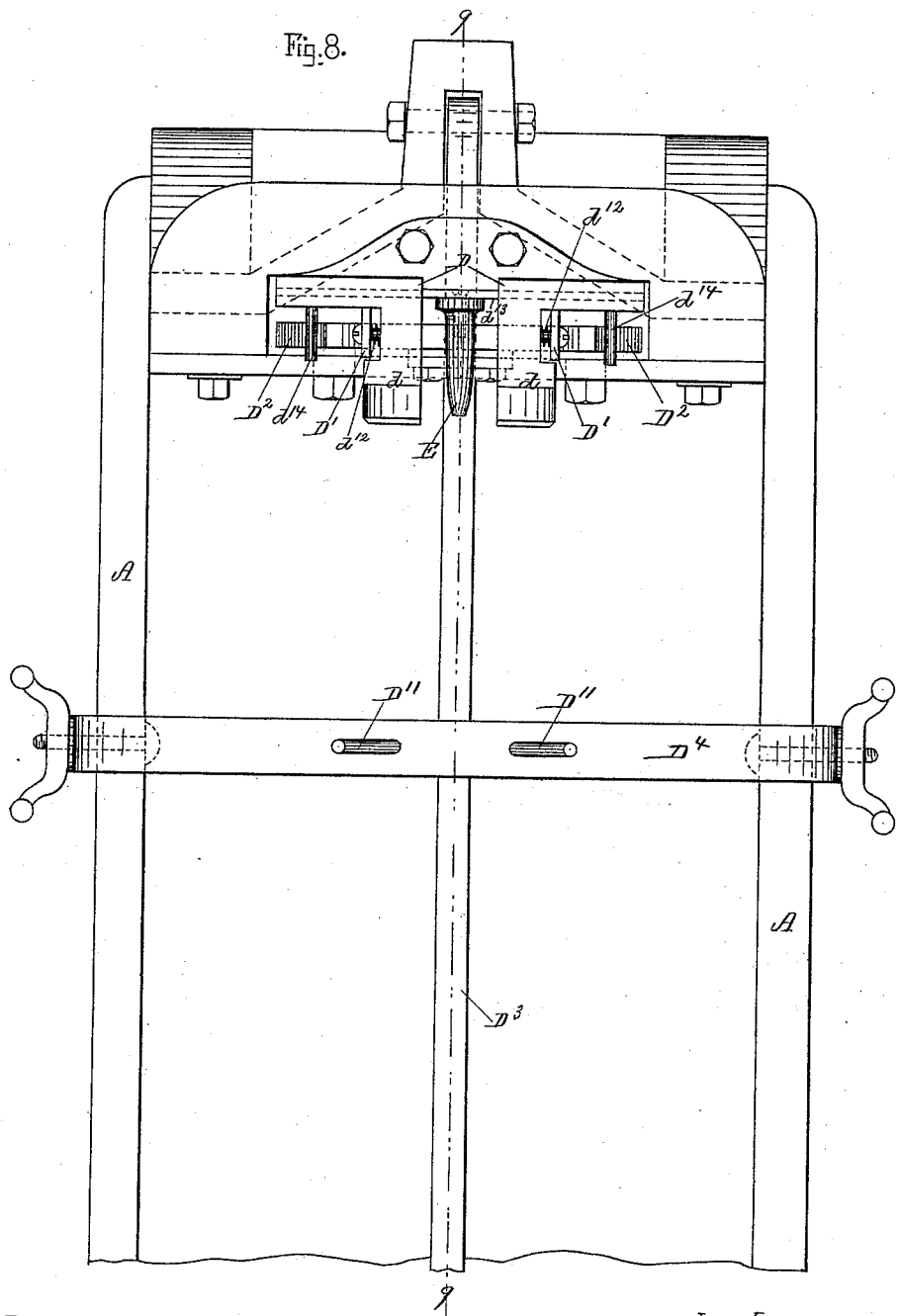
Witnesses.
Lauritz W. Möller.
John R. Snow.
Inventor
George A. Fullerton,
by his attorneys,
Magnadier & Beach.

(No Model.) 7 Sheets—Sheet 6.
G. A. FULLERTON.
BOTTLE MAKING MACHINE.
No. 426,497. Patented Apr. 29, 1890.
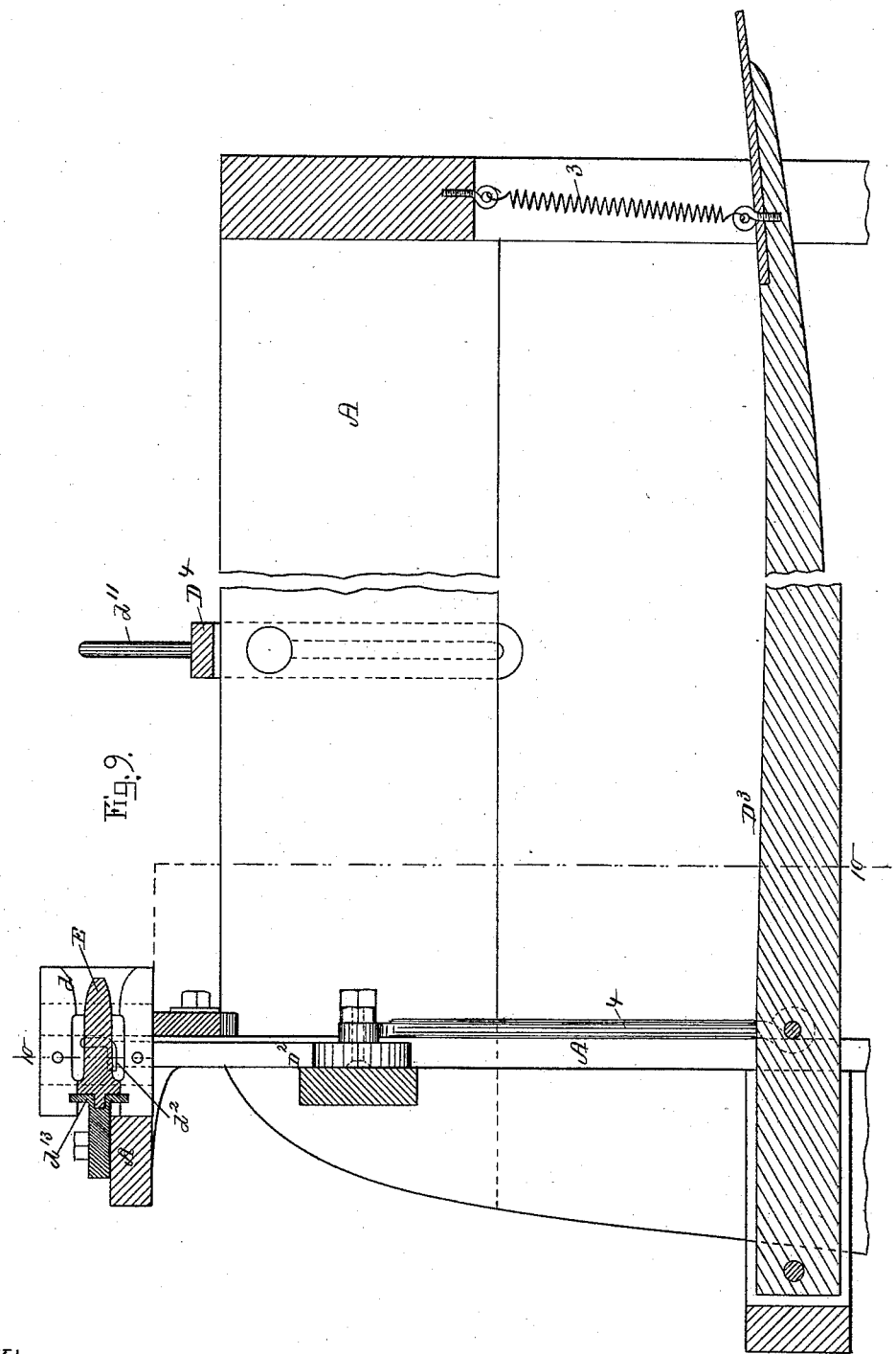
Witnesses.
Lauritz N. Møller
John R. Snow
Inventor.
George A. Fullerton
by his attorneys,
Maynadier & Beach (No Model.) 7 Sheets—Sheet 7.
G. A. FULLERTON.
BOTTLE MAKING MACHINE.
No. 426,497. Patented Apr. 29, 1890.
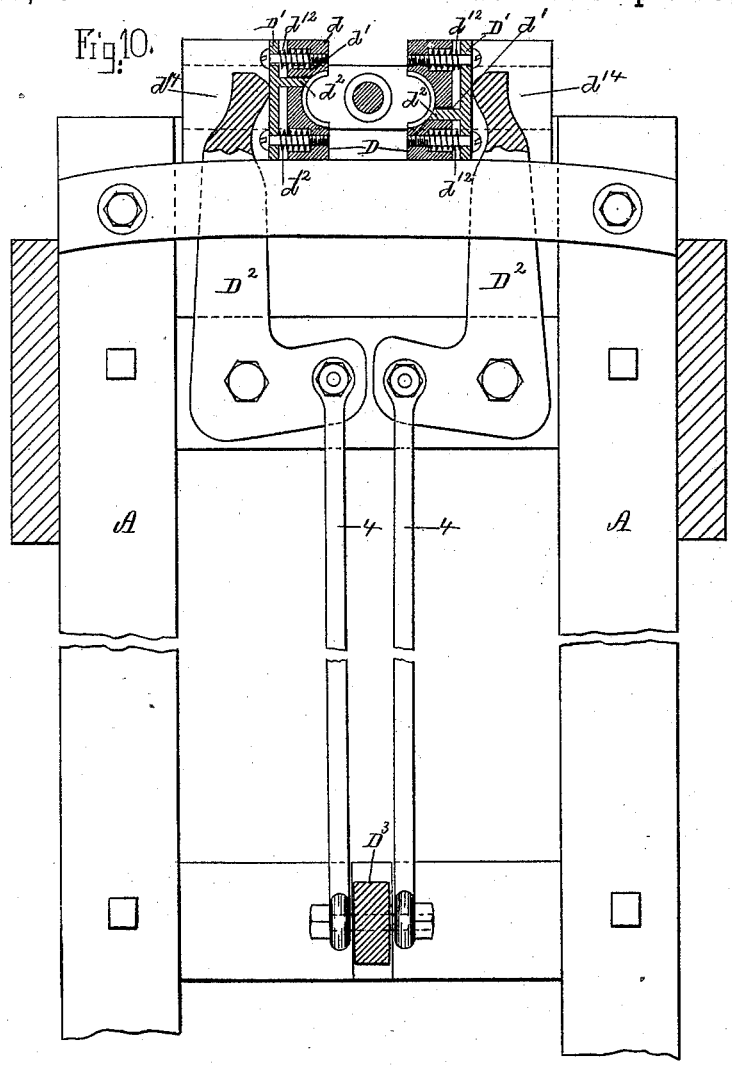
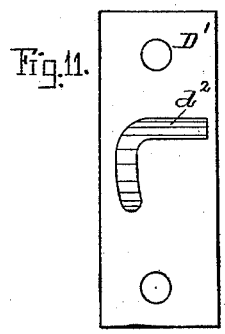
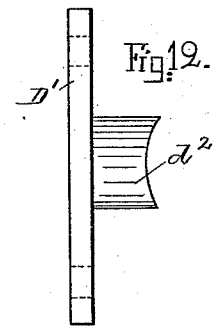
Witnesses.
Lauritz W. Möller,
John R. Snow.
Inventor
George A. Fullerton
by his attorneys,
Magnadier & Bloch.

UNITED STATES PATENT OFFICE.

GEORGE ARTHUR FULLERTON, OF BOSTON, MASSACHUSETTS, ASSIGNOR TO THE FACILE BOTTLE STOPPER COMPANY, OF NEW YORK, N. Y.

BOTTLE-MAKING MACHINE.

SPECIFICATION forming part of Letters Patent No. 426,497, dated April 29, 1890.

Application filed August 29, 1889. Serial No. 322,315. (No model.)

*To all whom it may concern:*

Be it known that I, GEORGE A. FULLERTON, of Boston, in the county of Suffolk and State of Massachusetts, have invented a new and useful Bottle-Making Machine, of which the following is a specification, reference being had to the accompanying drawings, in which—

Figure 1 is a front elevation of one form of machine embodying my invention, a part being broken away for greater clearness in showing certain parts hereinafter referred to. Fig. 2 is a top plan of what is shown in Fig. 1. Fig. $2^a$ is a rear elevation thereof. Fig. 3 is a transverse section of the machine on line 3 3 of Fig. 1. Fig. 4 is a central vertical section on line 4 4 of Fig. 2. Figs. 5 and 6 are different views of one of the pairs of die-carriers provided with the groove-forming dies, and Fig. 7 is a diagram illustrative of a modification. Figs. 8, 9, 10, 11, and 12 are views illustrating a modification of a machine embodying my invention, Fig. 8 being a partial plan, Fig. 9 a section on line 9 9 of Fig. 8, Fig. 10 a transverse section on line 10 10 of Fig. 9, and Figs. 11 and 12 an elevation and plan, respectively, of the die-carrier and die.

The object of my invention is to produce a machine for making bottles and other receptacles having grooves to receive the inwardly-turned ends of stopper-carriers; and my invention consists, mainly, in the combination of a divided female mold with one or more groove-forming dies, each reciprocating through an opening in an inner face of one or both members of the divided female mold.

In the drawings, in which my invention is embodied in one form of machine, A is a supporting-frame, in which is mounted a reciprocating frame B, made up of cross-heads $b$, connecting-bars $b'$, and auxiliary connecting-bars $b^2$.

The divisible female mold D, the combination of which with one or more groove-forming dies constitutes the main feature of my invention, is supported by links $a$ $a'$, each link $a$ being pinned to a member $d$ of mold D, and each link $a'$ being pinned to link $a'$ and to frame A. (See Figs. 3 and 4.)

One (or both) member $d$ of mold D is provided with an opening $d'$, to receive the groove-forming die $d^2$. Of course it will be plain to all skilled in the art that the members of mold D may be moved toward and away from each other in a great many different ways, and also that the die-carriers D' may be reciprocated in many different ways, and consequently that the mechanism here shown for actuating the grippers or members $d$ of mold D and the groove-forming dies $d^2$ may be greatly varied or other wholly-different mechanism substituted therefor without departing from the spirit of my invention, the object of which is to clamp the mouth end of a bottle or other receptacle, and then to form one or more grooves (preferably two grooves) of the proper form in the outer walls of the receptacle, each of which grooves receives an inwardly-turned end of bottle-stopper carrier.

In practicing my invention the receptacle is best placed on a spindle or support E, which enters the mouth of the bottle, and the mold D is closed upon the mouth end of the receptacle while it is in a plastic or semi-plastic condition. The dies $d^2$ are then passed through the openings $d'$ in the walls of the mold D, and thereby form grooves in the outer walls of the mouth end of the receptacle. These grooves will ordinarily be two in number and substantially L-shaped, and consequently the groove-forming dies $d^2$ are substantially L-shaped, as shown in Fig. 6, and the openings $d'$ are of proper shape to receive the dies $d^2$. As soon as the grooves have been formed the dies $d^2$ are moved out of the grooves, the members of mold D separated, and the receptacle is removed.

The mechanism which I have shown for actuating the molds and dies is the reciprocating frame B, the bars $b^2$ of which are formed with inclines which engage friction-rolls $b^3$, journaled in the members $d$ of the mold D. The members of mold D are supported, as explained above, by the freely-moving links $a$ $a'$, and are connected together by suitable guide-rods $d^4$, (see Figs. 1 and 3,) and consequently as the frame is moved to bring the inclines on the bars $b^2$ against the rolls $b^3$ the members $d$ of mold D are moved inwardly to clamp the receptacle. The die-carriers D' are each conveniently formed, as shown in Figs. 5 and 6, with an arm $d^5$, working in a slot $d^6$ in the other die-carrier. A frictionwheel $d^7$ is journaled in the back of each die-carrier D, and after the inclines on bars $b^2$ have forced members $d$ of the mold D together suitable inclines on the bars $b'$ engage the friction-rolls $d^7$, and the die-carriers D' are moved toward each other, so that the dies $d^2$ are thrust through the openings $d'$ and into the yielding outer walls of the mouth end of the receptacle. When the frame B is moved back, the inclines on the bars $b'$ allow the springs $d^8$, fast to spring A and engaging the projections $d^9$ on the die-carriers D', to move the die-carrier back, so that the dies $d^2$ are out of the grooves in the receptacle, and as the frame continues to rise the pins $d^{10}$ on the bars $b'$ engage the links $a'$ and move these links, so that members $d$ of the die D are separated to release the receptacle.

Frame B is conveniently reciprocated by means of a spring-controlled treadle, (not shown in the drawings, because well understood,) the treadle-rod B' being broken off in Fig. 1. It is desirable that the bars $b^2$ should be loosely secured in one of cross-heads $b$, so that they may be adjusted to the friction-rolls $b^3$, and so I form one of the cross-heads $b$ (in this case the upper cross-head shown in Fig. 1) with recesses $b^4$, in which I mount springs $b^5$, which are conveniently backed up by set-screws $b^6$.

It is desirable in some cases that the support E should move on its longitudinal axis, in order to prevent the glass or the like, when the machine is used for making glass or like receptacles, from sticking to the support.

Spindle E is conveniently rocked by springs 1, each spring being secured to the shank of the support and brackets 2 on frame A, and as frame B reciprocates one spring is shortened and the other lengthened, and consequently the spindle is rocked.

It will be plain from what has been said respecting the operation of this form of my machine that two grooves (when two grooves are required in the outer wall of the mouth end of the receptacle) are formed simultaneously, or substantially so. It will be plain that instead of forming these two grooves simultaneously they may be formed in succession, and in this case one die-carrier D' would suffice, and consequently only one die $d^2$ would be required, and in the modification shown in Fig. 7 I have shown but one die $d^2$. In this case, of course, the die-carrier will be drawn back after one groove is formed and the receptacle will be turned on the support E to bring another portion of its outer wall to the die $d^2$.

As I have said above, a great variety of mechanisms may be employed to actuate the members of the mold D and one or more dies $d^2$, as required.

In Figs. 8, 9, 10, 11, and 12 a modified form of the machine above described is shown. In this form of machine embodying my invention members $d$ slide on a T-shaped support $d^{13}$, fast to frame A, and springs $d^{12}$ are interposed between the die-carrier D' and the members $d$. Levers $D^2$ are fulcrumed to frame A and actuated from a treadle $D^3$. When the free ends of levers $D^3$ move inwardly, they press against the die-carriers, and as the springs $d^{12}$ are quite stiff the members $d$ of mold D are moved inwardly to clamp the receptacle. Continuation of the inward movement of the levers $D^2$ overcomes the resistance of springs $d^{12}$ and the dies $d^2$ are thrust inwardly to form the grooves. The levers are conveniently moved to relieve the pressure on the die-carriers by a spring 3, and stops $d^{14}$ are provided to limit the backward movement of the levers $D^2$.

In this form of machine it is convenient to use an adjustable auxiliary bottle-support $D^4$, which slides on frame A and is provided with pins $d^{11}$, to assist in holding the bottle. The levers $D^2$ are connected to treadle $D^3$ by connecting-links 4. The spindle E in this form of my machine is not adapted to be moved on its longitudinal axis, as it is in the other form of machine, in which, however, it is not necessary that the support E should be movable on its longitudinal axis. This modification illustrates what I have said above, to the effect that the members of the mold D and the dies $d^2$ (or a single die $d^2$, as the case may be) can be actuated by mechanism widely different in construction.

I therefore claim, broadly—

The combination of a support and a divisible mold having one or more openings through its walls with one or more dies mounted in said openings, and means for reciprocating the dies in said openings, the support projecting into the chamber of the mold, substantially as and for the purpose set forth.

GEORGE ARTHUR FULLERTON.

Witnesses:
EDWARD S. BEACH,
JOHN R. SNOW.